United States Patent
Liu et al.

(10) Patent No.: US 9,586,817 B2
(45) Date of Patent: Mar. 7, 2017

(54) SEMI-AUTO SCANNING PROBE MICROSCOPY SCANNING

(75) Inventors: Huiwen Liu, Eden Prairie, MN (US); Peter Gunderson, Ellsworth, WI (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/559,165

(22) Filed: Jul. 26, 2012

(65) Prior Publication Data
US 2013/0031680 A1 Jan. 31, 2013

Related U.S. Application Data

(60) Provisional application No. 61/512,875, filed on Jul. 28, 2011, provisional application No. 61/521,745, filed on Aug. 9, 2011.

(51) Int. Cl.
  *G01Q 30/04* (2010.01)
  *B82Y 35/00* (2011.01)

(52) U.S. Cl.
  CPC ............ *B82Y 35/00* (2013.01); *G01Q 30/04* (2013.01)

(58) Field of Classification Search
  CPC ........ G01Q 10/00; G01Q 10/02; G01Q 10/04; G01Q 10/045; G01Q 10/06; G01Q 10/065; G01Q 20/00; G01Q 20/02; G01Q 20/04; G01Q 30/00; G01Q 30/04; G01Q 40/00; G01Q 40/02; G01Q 60/24; G01Q 60/38; G01N 33/00; B82Y 35/00

USPC .......................... 850/1–6, 19–20, 33; 73/105
  See application file for complete search history.

(56) References Cited

U.S. PATENT DOCUMENTS

| | | |
|---|---|---|
| 4,752,686 A | 6/1988 | Brust |
| 5,077,473 A | 12/1991 | Elings |
| 5,400,647 A | 3/1995 | Elings |
| 5,415,027 A | 5/1995 | Elings |
| 5,418,363 A | 5/1995 | Elings |
| 5,420,796 A | 5/1995 | Weling |
| 5,461,907 A | 10/1995 | Tench |
| 5,463,897 A | 11/1995 | Prater |
| 5,496,999 A | 3/1996 | Linker |
| 5,520,769 A | 5/1996 | Barrett |
| 5,553,487 A | 9/1996 | Elings |
| 5,594,845 A | 1/1997 | Florent |

(Continued)

OTHER PUBLICATIONS

Bao Tianming, Automated AFM as an Industrial Process Metrology Tool for Nanoelectronic Manufacturing, Applied Scanning Probe Methods X , NanoScience and Technology, 2008, 359-412, Springer.

(Continued)

*Primary Examiner* — David E Smith
(74) *Attorney, Agent, or Firm* — Cesari & Reed, LLP; Kirk A. Cesari; Christian W. Best

(57) ABSTRACT

A semi-automated method for atomic force microscopy ("AFM") scanning of a sample is disclosed. The method can include manually teaching a sample and AFM tip relative location on an AFM tool; then scanning, via a predefined program, on the same sample or other sample with same pattern to produce more images automatically.

16 Claims, 2 Drawing Sheets

(56) References Cited

U.S. PATENT DOCUMENTS

| | | | |
|---|---|---|---|
| 5,715,334 | A | 2/1998 | Peters |
| 5,757,424 | A | 5/1998 | Frederick |
| 5,825,039 | A | 10/1998 | Hartley |
| 5,831,181 | A | 11/1998 | Majumdar |
| 5,852,232 | A | 12/1998 | Samsavar |
| 5,898,106 | A | 4/1999 | Babcock |
| 6,057,547 | A * | 5/2000 | Park .................... B82Y 35/00 850/10 |
| 6,057,914 | A | 5/2000 | Yedur |
| 6,172,506 | B1 | 1/2001 | Adderton |
| 6,288,392 | B1 | 9/2001 | Abbott |
| 6,337,479 | B1 | 1/2002 | Kley |
| 6,427,345 | B1 | 8/2002 | Alvis |
| 6,489,611 | B1 | 12/2002 | Aumond |
| 6,590,703 | B2 | 7/2003 | Park |
| 6,651,893 | B2 | 11/2003 | He et al. |
| 6,683,316 | B2 | 1/2004 | Schambler |
| 6,715,346 | B2 | 4/2004 | Shuman |
| 6,752,008 | B1 | 6/2004 | Kley |
| 6,862,924 | B2 | 3/2005 | Xi |
| 6,873,867 | B2 | 3/2005 | Vilsmeier |
| 6,880,389 | B2 | 4/2005 | Hare |
| 6,925,860 | B1 | 8/2005 | Poris |
| 6,975,755 | B1 | 12/2005 | Baumberg |
| 6,980,937 | B2 | 12/2005 | Hayes |
| 6,993,959 | B2 | 2/2006 | Shoelson |
| 7,009,172 | B2 | 3/2006 | Publicover |
| 7,406,860 | B2 | 8/2008 | Zhou |
| 7,435,955 | B2 | 10/2008 | West |
| 7,569,077 | B2 | 8/2009 | Kollin |
| 7,573,682 | B2 | 8/2009 | Pust |
| 7,746,404 | B2 | 6/2010 | Deng |
| 7,770,231 | B2 | 8/2010 | Prater |
| 8,043,652 | B2 | 10/2011 | Eby |
| 8,166,567 | B2 | 4/2012 | Phan |
| 8,296,860 | B2 | 10/2012 | Liu |
| 8,353,060 | B2 | 1/2013 | Watanabe |
| 8,495,759 | B2 | 7/2013 | Wakiyama |
| 2001/0038072 | A1 | 11/2001 | Aumond |
| 2001/0054691 | A1* | 12/2001 | Park et al. ................ 250/309 |
| 2002/0008760 | A1 | 1/2002 | Nakamura |
| 2003/0049381 | A1 | 3/2003 | Mirkin |
| 2004/0134265 | A1 | 7/2004 | Mancevski |
| 2007/0023649 | A1* | 2/2007 | West ........................ 250/307 |
| 2007/0251306 | A1 | 11/2007 | Zhou et al. |
| 2008/0147346 | A1* | 6/2008 | Eby .................... B82Y 35/00 702/94 |
| 2008/0308718 | A1* | 12/2008 | Kollin ................. 250/252.1 |
| 2010/0031402 | A1* | 2/2010 | Wakiyama .......... B82Y 35/00 850/1 |
| 2011/0055982 | A1* | 3/2011 | Watanabe ............ B82Y 35/00 850/2 |

OTHER PUBLICATIONS

Inspection of Pole Tip Diamondlike Carbon Wear Due to Heater-Induced Head-Disc Contact, Journal of Applied Physics, vol. 99, Issue 8, 2006, Bloomington.

High Performance Metrology Systems, View Engineering Inc., View Micro-Metrology, 2006, Tempe, AZ.

Non-Final Office Action, Jun. 24, 2014, U.S. Appl. No. 13/559,034, filed Jul. 26, 2012, Advanced Atomic Force Microscopy Scanning for Obtaining a True Shape, Hiuwen Liu.

Final Office Action, Feb. 4, 2014, U.S. Appl. No. 13/559,034, filed Jul. 26, 2012, Advanced Atomic Force Microscopy Scanning for Obtaining a True Shape, Hiuwen Liu.

Zhan, AFM operating-drift detection and analyses based on automated sequential image processing, Nanotechnology, 2007. IEEE-NANO 2007. 7th IEEE Conference on Aug. 2-5, 2007, pp. 748-753 http://ieeexplore.ieee.org/xpl/login.jsp?tp=&arnumber=4601295 &url=http%3A%2F%2Fieeexplore.ieee.org%2Fxpls%2Fabs_all.jsp%3Farnumber%3D4601295.

Alex Chen, et al., Enhancement and Recovery in Atomic Force Microscopy Images.

Babak Mokaberi, et al., Compensation of Scanner Creep and Hysteresis for AFM Nanomanipulation; Apr. 2008.

B. Mokaberi, et al.;Towards Automatic Nanomanipulation: Drift Compensation in Scanning Probe Microscopes; Conference Apr. 26-May 1, 2004.

Daniel Y. Abramovitch, et al., A Tutorial on the Mechanisms, Dynamics, and Control of Atomic Force Microscopes; Conference Jul. 9-13, 2007.

Ambios Technology Corporation Operator's Manual, Q-Scope™ 250/400, Nomad™; Sep. 2007.

Kindt, Atomic force microscope detector drift compensation by correlation of similar traces acquired at different setpoints; Review of Scientific Instruments vol. 73, No. 6 Jun. 2002.

West, A Guide to AFM Image Artifacts, Pacific Nanotechnology, Santa Clara CA. http://www.cma.fcen.uba.ar/files/Guide_AFM.pdf.

Seeger, Surface Reconstruction From AFM and SEM Images, 2004.

Venkataraman, Automated image analysis of atomic force microscopy images of rotavirus particles, Ultramicroscopy 106 (2006), 829-837.

Modeling while Interpreting, Overview; Paradigm, 2014. http://www.pdgm.com/Solutions/Interpretation-Modeling/Interpretation-Validation/Interpretation-while-modeling.

Fantner, Atomic Force Microscopy, Advanced Bioengineering Methods Laboratory, 2013 http://www.eng.uc.edu/~beaucag/Classes/Characterization/SEM_TEM_Lab/ABML%20%E2%80%93%20AFM%20module%20-%202013.pdf.

Non-Final Office Action, Oct. 3, 2014, U.S. Appl. No. 13/559,034, filed Jul. 26, 2012, Advanced Atomic Force Microscopy Scanning for Obtaining a True Shape, Hiuwen Liu.

* cited by examiner

SEMI-AUTO SCANNING PROBE MICROSCOPY SCANNING

CROSS REFERENCE TO RELATED APPLICATIONS

The present application claims priority to U.S. provisional patent applications Ser. No. 61/512,875, filed Jul. 28, 2011, entitled "Semi-Automatic Scanning Probe Tool", and Ser. No. 61/521,745, filed Aug. 9, 2011, entitled "Scanning Probe Microscopy Scanning Technique", the contents of which are hereby incorporated by reference in their entirety.

BACKGROUND

The present disclosure is generally related to systems, tools, software, control, and methods for a semi-auto scanning probe microscope techniques.

SUMMARY

In some embodiments, a method can include manually teaching a first sample and atomic force microscopy ("AFM") tip relative location on an AFM tool. The method may then scan, via an automated program, the sample with the AFM tool to produce one or multiple images of the sample.

In further embodiments, a device may include an atomic force microscopy ("AFM") tool having an AFM tip. The device may be adapted to allow a user to manually position a first sample relative to the AFM tip and then automatically scan the other samples that has the same pattern with the AFM tip to produce images for all of the rest samples based on an initial teaching on the first sample.

DETAILED DESCRIPTION

Figure 1:
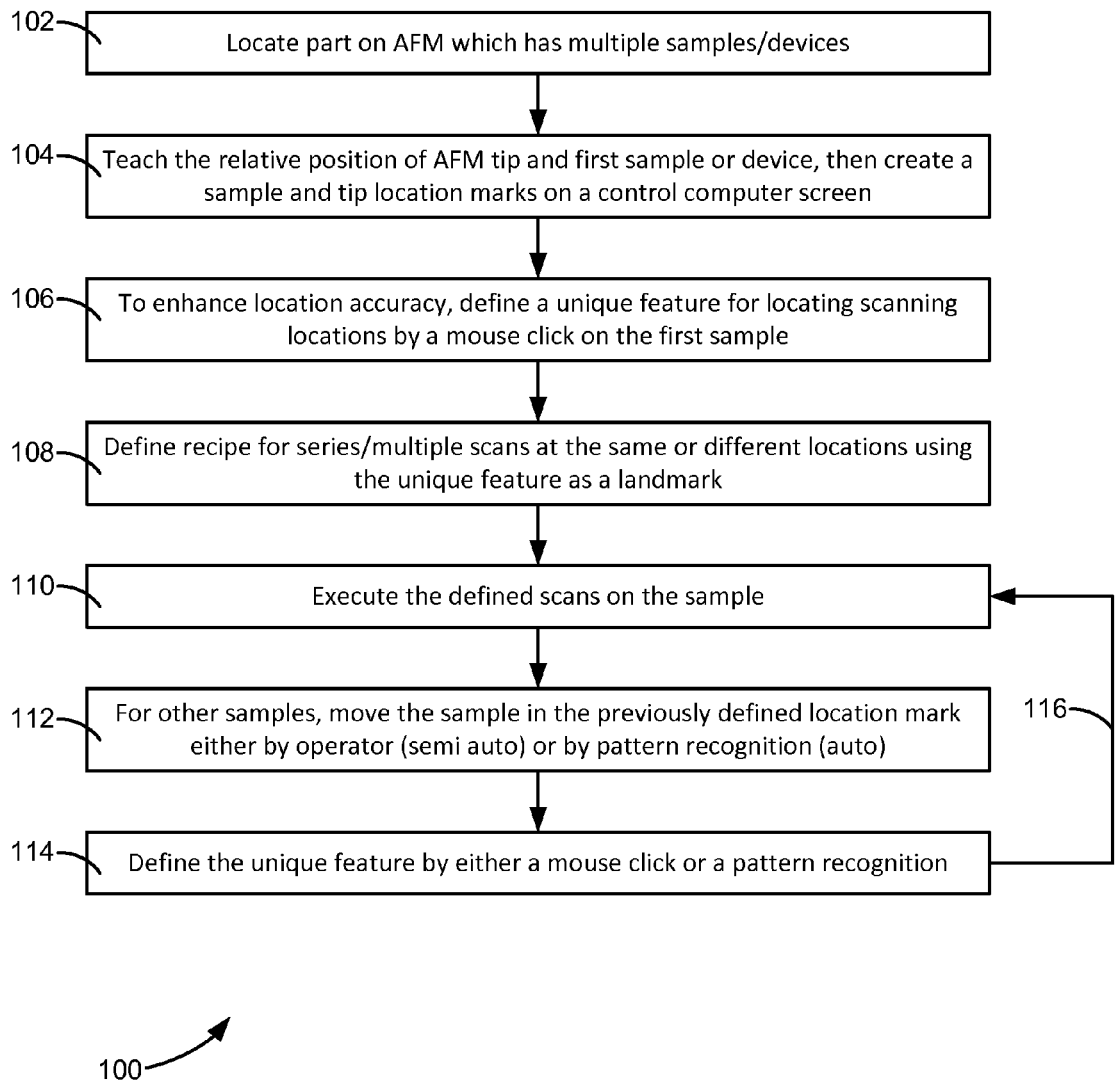
FIG. 1 is a diagram of an illustrative embodiment of a method for a semi-automatic scanning technique for a manual based scanning probe microscopy.

In the following detailed description of the embodiments, reference is made to the accompanying drawings which form a part hereof, and in which are shown by way of illustration of specific embodiments. It is to be understood that other embodiments may be utilized and changes may be made without departing from the scope of the present disclosure.

Scanning probe microscope techniques may be used for imaging and characterizing surface topology and properties at atomic resolution, such as for nanotechnology and nanoscience. Specifically, atomic force microscopy ("AFM") (which is one type of scanning probe microscope techniques) can be used as a metrology tool in nanotechnology manufacturing, and specifically in nanoelectronic device manufacturing. AFM has applications to determine topography, shape, dimensions, and other potential uses, such as in semiconductors, photolithography and photomasks, and devices implementing thin film technologies, such as a transducer for magnetic data storage.

Manufacturing devices on a microscale or nanoscale can involve a series of complex fabrication process steps, such as by sequential layering on a substrate. To achieve a goal of high quality and low cost, the manufacturing process may include various metrology and inspection steps within a manufacturing line, such as to monitor density, pattern geometry, shape, dimensions, topography, thickness, or material composition. Further, calibrations to devices or systems, or to the manufacturing process itself, may be made based on the measurements or information received from the various metrology and inspection steps. The various metrology and inspection steps may often be on a micron or nanometer scale; for example, a transistor gate width may approximately be in a range of 32 nm to 35 nm. AFM may be used in semiconductor fabrication as a dimension metrology tool, such as for etching and chemical mechanical polishing characterization. Similar process technologies may be used in the photomask industries and thin film industries, as well as applications in biology and medical devices. AFM allows a quick survey of a cross-sectional profile or surface topography to examine if a dimension is in specification, without destroying a product.

An atomic force microscope can scan a region of a sample that is highly localized and can be anywhere, as long as the space permits the tip size. The measurement may be generally free of bias arising from the target shape, pattern proximity, density, and material. With a feedback control loop, the atomic force microscope scanner can control a tiny probe to perform scanning motion in x (or y) and z directions to maintain a close proximity between the probe and sample surface, acquiring high-resolution positional data in all x, y, and z axes. A two or three dimensional topographic image can be constructed from the x/y/z spatial data. The scanned pattern or topographic image may be any shape, such as a rectangle, square, octagon, or any other shape.

Once a topographic image is constructed, offline (i.e. not necessarily done within the AFM tool) software analysis can de-convolute the tip shape from the AFM images and extract important geometric parameters about the measured target, such as depth, line width at top/middle/bottom locations, sidewall angle and profile shape, or surface topography.

AFM may be implemented on a completely manual AFM tool; however, performing such measurements could be very tedious and difficult. This can affect a throughput in a production environment. AFM may also be implemented as a completely automated process for industrial manufacturing applications, such as by programming a recipe (such as a pre-determined program which may include defining AFM tip and sample relative locations, setting proper scanning parameters, and execute series scans at the same or different locations) into an AFM tool for automated metrology measurements. A completely automated based AFM system can perform the process, but a lot of hardware is required for tip alignment and pattern recognition. Thus, the costs of a fully automated AFM tool can be relatively high, such as three or four times higher than a manual tool. The methods and systems disclosed herein are designed to solve such problems by enabling a semi-automatic or even fully automatic (or semi-automated or automated) measurement(s) on a manual AFM tool.

In a first example, referring to FIG. 1, a method for a semi-automatic scanning technique for a manual based scanning probe microscopy is shown and generally designated 100. The method 100 may be implemented on an AFM tool and may include more steps or fewer steps than as shown in FIG. 1.

The method 100 can include locating a sample or part on an AFM tool, at 102, that may be capable of processing multiple samples or devices. For example, this may include locating a sample within a certain proximity to the AFM tip. This can be done manually. For example, an operator may manually load the part, such as by using a step motor. The placement of the part may be visible to an operator on a display.

Then, the method 100 may teach the relative position of the AFM tip and first sample or device, at 104. The method 100 may also create a sample and tip location marks on a control computer screen, also at 104. The software of the AFM tool then can define the sample and tip location for further samples. Further, the AFM tool may include a display to show an image to the operator to allow the operator to manually select a location, via a cursor, as the starting location of a tip.

To enhance location accuracy, a unique feature for locating scanning locations may be defined by the operator, such as by a mouse click on an image of the first sample, at 106. However, the identification of a unique feature may also be done automatically with pattern recognition. The software of the AFM tool may also store the XY coordinate information about the unique feature. Then, a recipe (or pre-defined program or coordinate) for a series of scans or multiple scans at the same or different locations using the unique feature as a landmark can be defined, at 108. An operator may program the recipe via the software or the recipe may already be pre-defined in the software or controller. The recipe may include multiple positions of the sample and multiple iterations of a scan.

Once the recipe is established, the method 100 may execute the defined scans on the sample, at 110. All of the defined scans may be performed; however, in some instances, less than all of the pre-defined scans may be completed, such as upon detection of an error, a malfunction, or a sample misplacement. The types of scans, number of scans, and properties measured may be set by the operator or by software. The scans may provide data to the software to determine features or measurements of the sample. Based on the features or measurements of the part, calibrations, analysis, or other operations may be performed.

Once the scans are done on a first sample, a next sample may be moved into the previously defined sample location marks, at 112, which may be done either manually by the operator or automatically using pattern recognition. The operator may see the position of the next sample on the display, which may also show the sample location marks, the tip location marks, or both. The unique feature may then be identified for the new sample, at 114, which may be done manually, such as by a mouse click by the operator, or automatically using pattern recognition.

The method 100 may then repeat, at 116, executing the defined scans, at 110, for the next part and any parts thereafter. Thus, once a first sample part has been processed with the steps 102-110, the method 100 only need repeat steps 110, 112, and 114 for subsequent sample parts.

Figure 2:
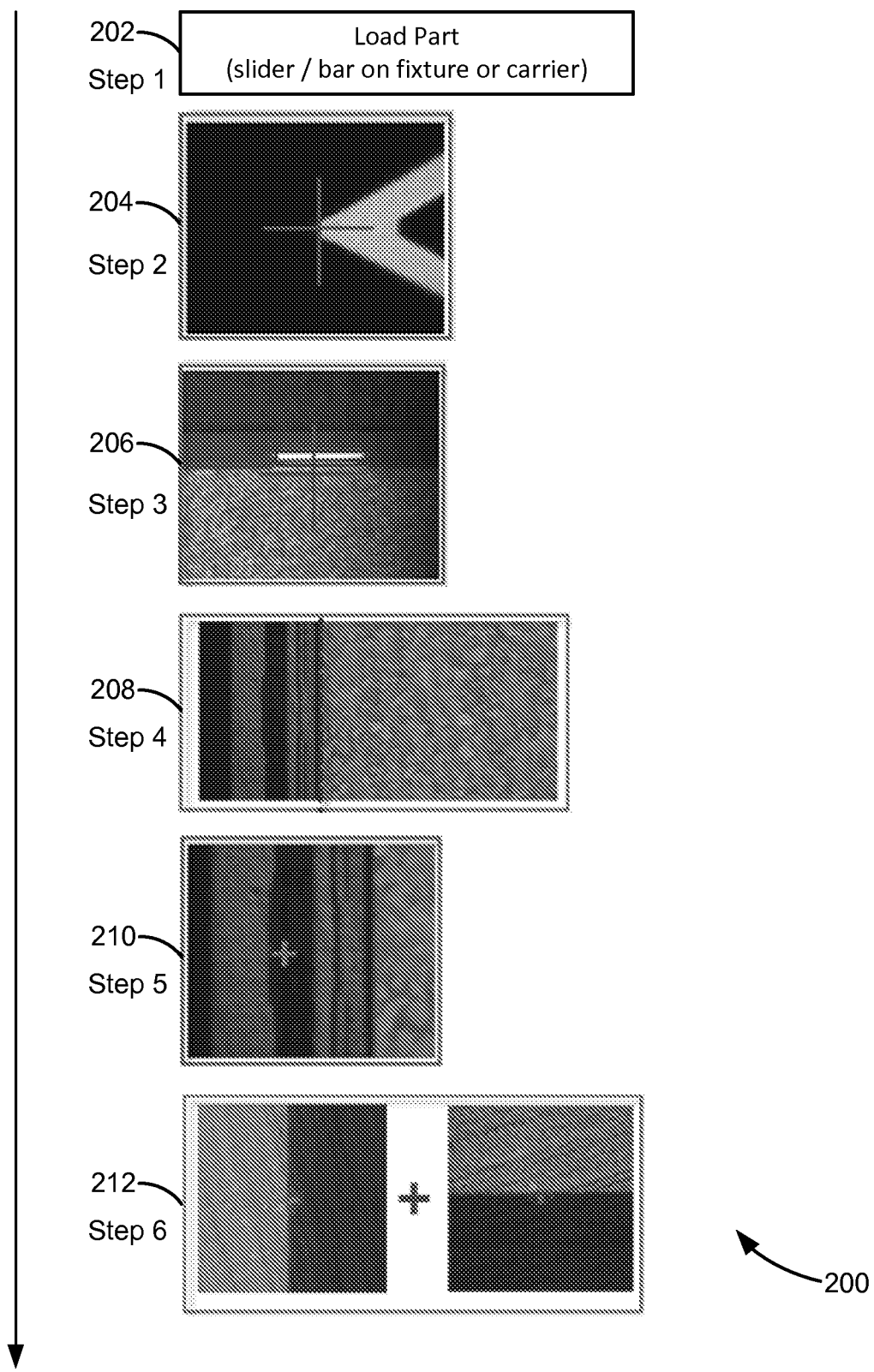
FIG. 2 is a diagram of another illustrative embodiment of a method for a semi-automatic scanning technique for a manual based scanning probe microscopy.

Referring to FIG. 2, a diagram of another illustrative embodiment of a method 200 for a semi-automatic scanning probe method and tool is shown. FIG. 2 provides an example of an implementation of method 100 for a semi-automatic scanning probe method as applied to recording head transducers (i.e. thin film heads) for magnetic recording, although the method of FIG. 2 may be applied to other devices and technologies.

The method 200 may include manually loading a part onto a system, at 202, such as via a slider or bar with a fixture or carrier. Next, an operator may teach a tip and sample relative location of the first part, at 204. The control monitor may display an image of the part and location markings to allow the operator to position the part. Once the operator has positioned the part, the AFM control computer may generate a crosshair marker, a box, or any combination thereof to indicate on the visual display an ideal tip location, sample location, or both, at 206. The tip location and sample location may be saved to allow placement of successive parts. In some embodiments, the method 200 may be fully automated.

Once the part is approximately in the ideal location, the AFM system may perform a first scan and visually display the scan result on a display, at 208. Then, the operator may use a location selector, such as a mouse click, to define a specific position or unique feature, at 210. The AFM software will then execute any other programmed scans, such as the scans shown at 212 to produce the images. The scans may be used for imaging, measuring, and manipulating matter, especially at the nanoscale.

For a next sample, an operator may return to step 3, at 206, and position the tip location and sample location of the next part in the box or other markings shown on the display. The box or other markings may correspond to the previously saved markings Once the next part is in position, the AFM control computer can execute the rest of the scans. For any next parts, the unique feature may be identified manually, such as by the operator, or automatically using pattern recognition.

In accordance with various embodiments, the methods and systems described herein may be implemented as one or more software programs running on a computer processor or controller. Further, a physical computer readable storage medium may store instructions, that when executed by a processor or computer system, cause the processor or computer system to perform the methods described herein. Dedicated hardware implementations including, but not limited to, application specific integrated circuits, programmable gate arrays, and other hardware devices can likewise be constructed to implement the systems and methods described herein. The systems and methods described herein can be applied to any type of computer processing system that can perform the processes described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

What is claimed is:
1. A method comprising:
  manually loading a first sample;
  manually locating the first sample within a certain proximity to an atomic force microscopy ("AFM") tip on an AFM tool, including:
    displaying a placement of the first sample to an operator on a display;
    creating a sample location mark and a tip location mark on the display;

manually defining, via the operator, a unique feature of an image pattern of the first sample;
determining an automated program via designating a series of scan locations using the unique feature as a landmark, the automated program includes a series of scans to be performed at the scan locations using the unique feature as a landmark;
storing the automated program in the memory to be executed for scans on other samples wherein the AFM tool defines the sample location mark and the tip location mark to be used for at least one future sample; and
scanning, via the automated program, the first sample with the AFM tool to determine a measurement of the first sample.

2. The method of claim 1 further comprising repeating the automated program for a next sample.

3. The method of claim 1 wherein the manually loading comprises using a step motor.

4. The method of claim 1 further comprising calibrations, analysis, or other operations are performed based on the measurement.

5. A method comprising:
manually loading a first sample;
manually locating the first sample within a certain proximity to an atomic force microscopy ("AFM") tip on an AFM tool, including:
displaying a placement of the first sample to an operator on a display;
creating a sample location mark and a tip location mark on the display;
manually defining, via the operator, a unique feature of an image pattern of the first sample;
determining an automated program via designating a series of scan locations using the unique feature as a landmark, the automated program includes a series of scans to be performed at the scan locations using the unique feature as a landmark;
storing the automated program in the memory to be executed for scans on other samples;
scanning, via the automated program, the first sample with the AFM tool to determine a measurement of the first sample;
when the series of scans are done on the first sample, moving a next sample into a location that approximately aligns with the sample location mark previously defined;
identifying the unique feature for the next sample; and
performing the series of scans via the automated program on the next sample.

6. The method of claim 5 further comprising repeating the automated program for a next sample.

7. The method of claim 5 wherein the manually loading comprises using a step motor.

8. The method of claim 5 further comprising calibrations, analysis or other operations being performed based on the measurement.

9. An apparatus comprising:
an atomic force microscopy ("AFM") tool having an AFM tip, the device adapted to:
allow a user to manually position a first sample relative to the AFM tip, including:
display a placement of the first sample to an operator on a display;
create a sample location mark and a tip location mark on the display, where the sample location mark is stored in the memory for use with at least one future sample;
allow the operator to manually define a unique feature of an image pattern of the first sample;
determine an automated program via designating a series of scan locations using the unique feature as a landmark, the automated program includes a series of scans to be performed at the scan locations using the unique feature as a landmark;
store the automated program in memory to be executed for scans on other samples; and
scan, via the automated program, the first sample with the AFM tip to produce an image of the first sample.

10. The apparatus of claim 9 wherein the device is further adapted to position a next sample based on the sample location mark previously defined and repeat the scan via the automated program for the next sample.

11. The apparatus of claim 9 further comprising the display to provide a view of the first sample and a human interface device to allow a user to manually select one or more positioning marks for the first sample.

12. The apparatus of claim 9 further comprising a step motor to manually position the first sample.

13. The apparatus of claim 10 further comprising a loader to provide the next sample to the AFM tool.

14. The device of claim 11 further comprising:
a microprocessor to execute a program to perform the scan; and
the memory to store the image.

15. The apparatus of claim 14 wherein the microprocessor is adapted to determine a measurement of the first sample based on the image.

16. The apparatus of claim 15 further comprising:
a display to provide a visible placement of the first sample to an operator;
the display shows an image to the operator and the device allows the operator to manually select the starting location wherein the series of scans provide data to determine a measurement of a sample; and
calibrations, analysis, or other operations are performed based on the measurement.

* * * * *